J. A. MYERS.
BICYCLE OR TRICYCLE.
APPLICATION FILED JAN. 2, 1917.
1,258,431.
Patented Mar. 5, 1918.
2 SHEETS—SHEET 2.
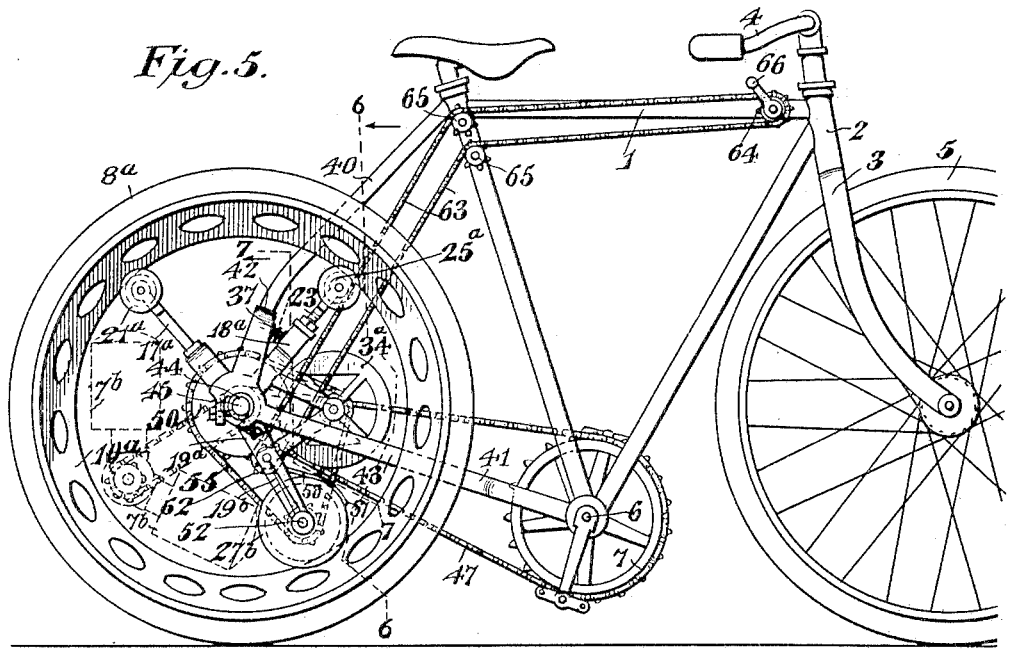
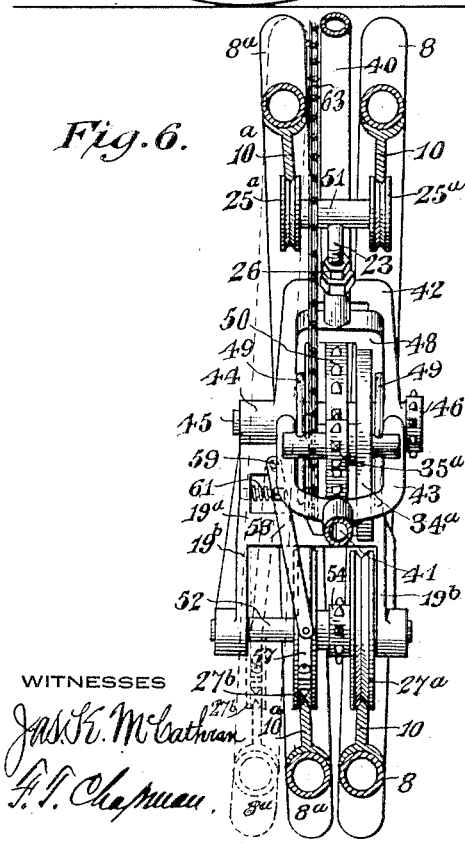
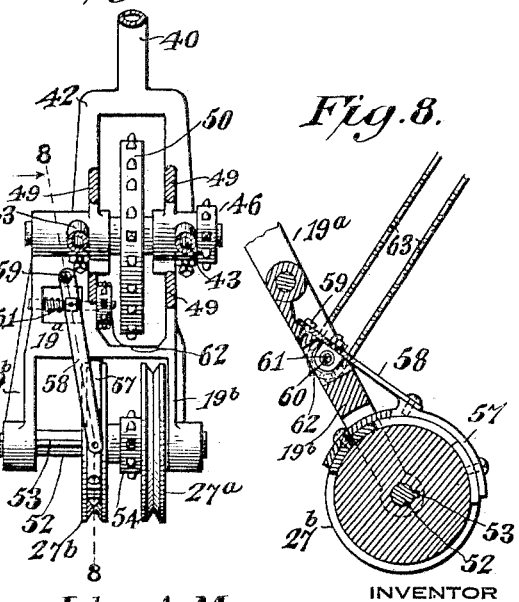
John A. Myers,
INVENTOR

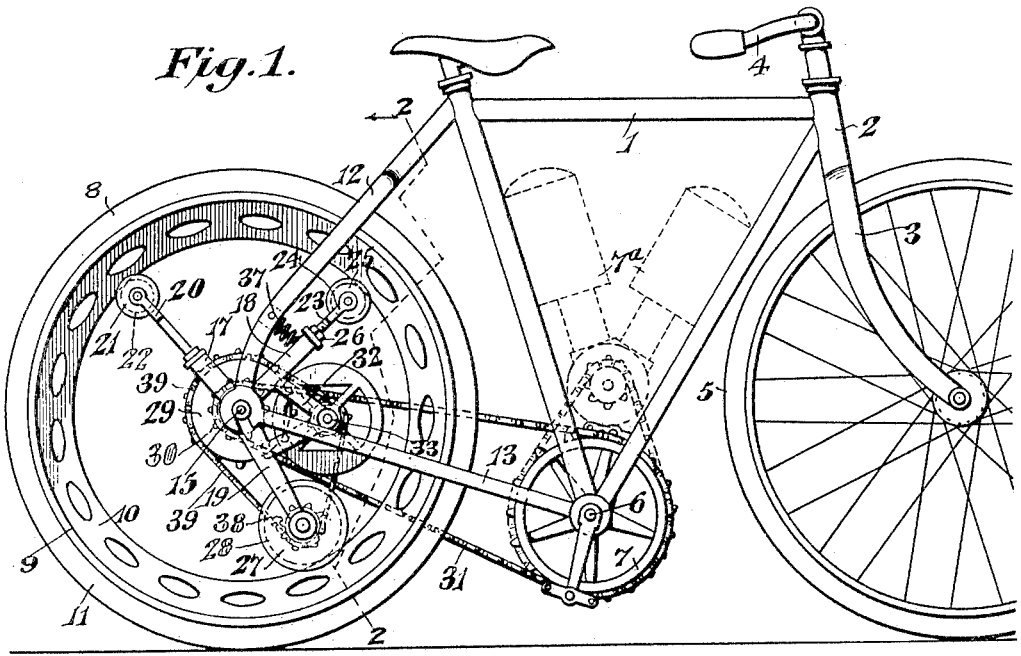

UNITED STATES PATENT OFFICE.

JOHN AUGUST MYERS, OF CLEVELAND, OHIO.

BICYCLE OR TRICYCLE.

1,258,431. Specification of Letters Patent. Patented Mar. 5, 1918.

Application filed January 2, 1917. Serial No. 140,169.

*To all whom it may concern:*

Be it known that I, JOHN A. MYERS, a citizen of the United States, residing at Cleveland, in the county of Cuyahoga and State of Ohio, have invented a new and useful Bicycle or Tricycle, of which the following is a specification.

This invention has reference to vehicles of the type known as bicycles or tricycles, and its object is to provide a driving mechanism wherein power is stored in an inertia element to contribute to the steadiness of drive, and wherein a spokeless drive wheel may be employed, whether such drive wheel be of the single or double type.

The invention comprises a driving mechanism lodged in and forming sustaining means for the rear or driving wheel of the vehicle, or driving wheels of the vehicle in the case of a tricycle. The vehicle may be provided with an ordinary form of diamond frame with a front fork and front wheel corresponding to the usual parts of like character as employed in bicycles. Furthermore, the usual crank shaft and sprocket wheel are employed and the remainder of the frame of the vehicle may in most part correspond to the structure of an ordinary bicycle, being changed in some respects because of the peculiar driving mechanism employed.

Whether one or two driving wheels be used they are in the main alike. The driving wheel comprises a rim with an inwardly directed radial flange, the rim being arranged to carry the usual pneumatic tire. The wheel, however, is a spokeless and hubless wheel, the rim and flange being in the form of an annulus. The frame is provided with a rear axle carrying driving and supporting rollers in such divergent relation as to sustain the drive wheel by engagement with the interior flange thereof. The roller carrying frame also sustains an inertia or fly wheel, and at the point corresponding to the hub of an ordinary wheel the frame carries a hub with sprocket wheels, one of which is connected to the driving sprocket wheel of the crank shaft by a suitable sprocket chain, while the other one is connected by a sprocket chain to sprocket wheels fast to the inertia wheel and to one of the rollers by means of which the driving wheel receives motion from the crank shaft.

In the case of a tricycle provision is made for two rear driving wheels which may be made to approach or recede at the tread portions, thereby varying the supporting part of the vehicle as to width, and in the event of the spreading of the wheels increasing the stability of the tricycle.

The invention will be best understood from a consideration of the following detailed description taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a side elevation of a bicycle embodying the invention.

Fig. 2 is a section on the line 2—2 of Fig. 1, but on a larger scale.

Fig. 3 is a view of the roller carrying frame as seen from the front of the bicycle.

Fig. 4 is a rear view of the frame shown in Fig. 3.

Fig. 5 is a side elevation of a tricycle constructed in accordance with the invention.

Fig. 6 is a section on the line 6—6 of Fig. 5 but drawn on a larger scale.

Fig. 7 is a section on the line 7—7 of Fig. 5 but drawn on the scale of Fig. 6.

Fig. 8 is a section on the line 8—8 of Fig. 7, but omitting distant parts.

Referring to the drawings there is shown a frame 1 such as is customarily employed on bicycles, and known as a diamond frame. The usual steering post 2 is provided with a front fork 3, handle bars 4 and front wheel 5, as well as a pedal shaft 6 and sprocket wheel 7 thereon, all as are customary in bicycles.

In the structure shown in Figs. 1 to 4, which are illustrative of a bicycle embodying the invention, there is a rear or driving wheel 8 comprising a rim 9 with an interior annular flange 10 projecting for a short distance radially toward the axis of the rim, which latter is shown as arranged for the reception of a tire 11 which may be of the cushion or pneumatic type, or of any other type desired.

The frame 1 has rear forks 12, 13 in the main corresponding to the rear forks of an ordinary bicycle frame and carrying journal bearings 14 for a shaft or axle 15. Mounted on the shaft 15 is a frame 16 comprising in the particular showing of the drawings three divergent arms 17, 18, 19, respectively. The arm 17 has a forked extremity 20 in which is mounted a roller 21 having a peripheral groove 22 seating the inner edge of the flange 10. The arm 18 is provided with an extension 23 terminating in a fork 24 in which is mounted a roller 25 having a peripheral groove seating the flange 10. The extension 23 is in the form of a threaded stem threaded into the end of the arm 18 and there held by a lock nut 26, so that the effective length of the arm 18 with the extension 23 may be varied. The arm 19 may be a simple forked arm and has a roller 27 mounted therein, this roller also having a peripheral groove 28 seating the flange 10. The roller 27 is shown as larger than either of the rollers 21 or 25, although all the rollers may be of the same size.

Mounted on the shaft 15 is a sprocket wheel 29 and also on the shaft 15 there is a sprocket pinion 30 exterior to the frame member 12. The driving sprocket wheel 7 and the sprocket pinion 30 are connected by a sprocket chain 31 in the same manner as in ordinary bicycles.

The frame 16 has other arms 32 joining at their forward ends in bearings 23 in which are journaled an inertia wheel 34 having at one side thereof and attached thereto a sprocket pinion 35 in line with the sprocket wheel 29. The frame 16 has other journal bearings 36, by means of which the frame is mounted on the axle 15, but is not secured thereto, so that the axle may turn without affecting the frame 16.

The rollers carried by the frame 16 engage and maintain the wheel 8 in proper relation to the frame 1, this being facilitated by a spring 37 between the arm 18 and the frame member 12, so that the two are joined with some flexibility of movement between them.

The roller 27 has a sprocket pinion 38 fast thereto, and engaging about the sprocket wheel 29, the sprocket pinion 35 and the sprocket pinion 38 is a sprocket chain 39.

The grip of the roller 27 upon the drive wheel 8 is determined by the effective length of the extension 23 which may be adjusted by means of the nut 26. The rollers 21 and 25 are idlers, and so do not interfere with the turning of the drive wheel. The roller 27, however, is connected by the sprocket chain 39 to the sprocket wheel 29 and to the inertia wheel 34, while the sprocket wheel 29 is driven by power applied to the pedals connected to the driving sprocket wheel 7. Power may be applied to drive the machine from a motor, such as indicated in dotted lines at $7^a$ in Fig. 1. When it is desired to ride the bicycle the rider propels the machine by foot power or drives it by the motor in the usual way, motion being thereby imparted to the inertia wheel 34 and to the drive roller 27 and from the latter to the drive wheel. In order to sustain the drive wheel and maintain the driving pressure of the roller 27 on the flange 10 the rollers are separated by a suitable distance circumferentially of the drive wheel, a spacing of one hundred and twenty degrees being particularly effective, but a less spacing between certain of the rollers and a greater spacing between others is admissible.

The inertia wheel 34 is advantageous in imparting a steadiness of motion, greatly contributing to the ease of driving the bicycle.

In Figs. 5 to 8 there is shown a tricycle structure and certain parts of the frame of the vehicle or machine agree with the showing of Fig. 1, and therefore the same reference numerals have been applied and no further description of such common parts is necessary.

In the tricycle two rear drive wheels are provided side by side. These drive wheels are alike and are also like the drive wheel 8 of Fig. 1. For this reason one of the drive wheels is designated by the reference numeral 8 and the other by the reference numeral $8^a$. The rim, flange and tire of each wheel 8 and $8^a$ being the same as in Fig. 1 the same reference numerals are used for such parts as are used in Fig. 1.

Instead of employing rear forks like the forks 12 and 13 of Fig. 1, the frame is provided with rear tubes 40 and 41, respectively, terminating at the rear ends in forks 42 and 43, respectively, joining in journal bearings 44 for an axle 45 carrying at one end a sprocket pinion 46 connected by a sprocket chain 47 to the sprocket wheel 7.

Mounted on the axle or shaft 45 is a frame 48 having side members 49 carried by the shaft or axle 45 on opposite sides of a sprocket wheel 50 fast to the axle 45 and corresponding to the sprocket wheel 29 of the structure of Fig. 1. The frame 48 corresponds to the frame 16 of the structure of Fig. 1, but varies therefrom in some particulars. It is provided with divergent arms corresponding to those of the frame 16 and designated in the showing of Fig. 5 and associated figures as arms $17^a$, $18^a$ and $19^a$, respectively. The arm $17^a$ carries rollers $21^a$. The arm $18^a$ has an extension 23 which, however, terminates in a cross head 51 carrying rollers $25^a$ at opposite ends, each roller being peripherally grooved to engage respective flanges 10 and $10^a$ of the drive wheels 8 and $8^a$. The arm $19^a$ has a laterally expanded fork end 19ᵇ carrying a shaft 52 journaled in the fork.

Mounted on the shaft 52 are two rollers 27ª and 27ᵇ corresponding to the roller 27 of Fig. 1. One of these rollers, say, the roller 27ª, engages a flange 10 of the driving wheel 8, while the roller 27ᵇ engages the flange 10ª of the driving wheel 8ª. By having a spline 53 on the shaft 52 it is only necessary to drive the shaft by means of a sprocket pinion 54 fast thereon and a sprocket chain 55 engaging the sprocket wheel 50 in order to drive both wheels 8 and 8ª through the rollers 27ª and 27ᵇ.

The frame 48 has approaching arms corresponding to the arms 32 of Fig. 1, and these arms where meeting carry an inertia wheel 34ª corresponding to the inertia wheel 34 of Fig. 1. The sprocket chain 55 engages a sprocket pinion 35ª fast to the inertia wheel in the same manner as has already been described with reference to similar structures in Fig. 1.

With the arrangement shown and described in Fig. 5 and associated figures a rider propelling the sprocket wheel 7 causes both drive wheels 8 and 8ª to rotate simultaneously, and the machine is driven in the same manner as in Fig. 1 except that the rear support is wider. A power motor 7ᵇ may be used in the structure of Fig. 5 the same as in the structure of Fig. 1 and may be installed in the drive wheel portion of the wheel instead of in the frame, as in Fig. 1. In fact, the motor 7ª or 7ᵇ may be located in either form of the machine wherever found most convenient.

The rollers 21ª and 25ª are spread apart so that the upper portions of the drive wheels are correspondingly spread. Because of the breadth of the fork or yoke 19ᵇ the rollers 27ª and 27ᵇ may be caused to approach or to recede, and then will cause a corresponding change in the relation of those portions of the drive wheels next to the ground, so that the spread of the wheels at the ground may be sufficient to produce a tricycle having a rear spread corresponding to ordinary tricycles, or the wheels may be brought so close together as to correspond closely to an ordinary bicycle. In order to cause the spread of the wheels either by moving one wheel or both, one or both of the rollers 27ª and 27ᵇ may be under the control of a mechanism which will be described with reference to one of the rollers only, since when both rollers are so equipped the structures are substantially identical. If it be considered that the roller 27ᵇ is the one to be adjusted, it is provided with a forked member 57 carried by a pivoted arm 58 having a pivot connection 59 with the frame 48 at the end remote from its connection with the fork 57. Moreover, the arm 58 carries a nut 60 movable along a screw 61 mounted in the frame 48 and in turn carrying a sprocket pinion 62 engaged by a sprocket chain 63 which may be extended to a sprocket pinion 64 on the frame 1 close to the handle bars, and if need be also carried over idler sprocket pinions 65 acting as direction-changing devices. The pinion 64 is shown as under the control of a handle 66 so that the chain 63 may be actuated to turn the screw 61 to move the arm 58 in one direction or the other. In this way the controlled roller 27ᵇ is shifted toward and from the roller 27ª and a corresponding shift of the wheel 8ª results. By duplicating the parts with the sprocket pinion 62 common to both screws and the screws properly related the wheels 8 and 8ª may be shifted oppositely and simultaneously to cause them to spread or approach where engaging the ground.

The structures of Figs. 1 and 5 and associated figures are substantially identical except that Fig. 5 duplicates some parts shown in Fig. 1 and therefore provides a tricycle structure instead of a bicycle structure. Those parts which contribute to the ease of running of the bicycle structure are retained in the tricycle structure, while the tricycle structure provides for a more stable upstanding of the machine, but permits the conversion of the tricycle structure into a machine closely simulating a bicycle structure.

What is claimed is:—

1. A bicycle or tricycle provided with a drive wheel in the form of an annulus, divergent arms with rollers engaging and sustained by the annulus, driving means for one of the rollers having connections thereto, propelling means for the driving means, and an inertia wheel located to one side of the axis of the annulus and carried by the arms, said inertia wheel being engaged and actuated by the connections between the propelled roller and the driving means therefor.

2. A bicycle or tricycle having a drive wheel in the form of an annulus, divergent arms with rollers engaging and sustained by the annulus, driving means for one of the rollers having driving connections therewith, and an inertia wheel mounted between the driving means and the annulus, and engaged and actuated by the connections between the roller and driving means, said connections being proportioned to drive the inertia wheel at a higher speed than the driving means.

3. A bicycle or tricycle having a driving wheel in the form of an annulus, propelling means for the drive wheel including a rotatable member engaging the annulus to rotate it, another rotatable member mounted in the axis of the annulus, said rotatable members having chain and sprocket connections, and an inertia or fly wheel mounted within the margins of the annulus to one side of the axis thereof and provided with a sprocket wheel engaged by the sprocket chain, with the sprocket wheel proportioned to actuate the inertia wheel at a higher speed than the rotatable member propelling the drive chain.

4. A tricycle provided with a pair of driving wheels comprising tire receiving rims with inwardly directed radial flanges, a frame for the wheels located interior and common to both wheels and having divergent arms with rollers engaging respective flanges of the wheels, means for propelling the wheels through certain of the rollers, and means for causing the separation and approach of the ground engaging portions of the wheels at will.

5. A tricycle provided with a pair of driving wheels comprising tire receiving rims with inwardly directed radial flanges, a frame for the wheels located interior and common to both wheels and having divergent arms with rollers engaging respective flanges of the wheels, means for propelling the wheels through certain of the rollers, and means for causing the separation and approach of the ground engaging portions of the wheels at will, the propelling means also including an inertia wheel connected thereto for actuation by the propelling means.

6. A tricycle comprising a suitable frame with a steering wheel, a pair of propelling wheels each consisting of a tire receiving rim having an inwardly directed annular flange, a frame mounted on the main frame and provided with divergent arms, rollers on the arms engaging the flange, one of the arms being adjustable lengthwise to determine the pressure of the rollers on the flange, an inertia wheel carried by the second named frame, pedal driving means connected to certain of the rollers and to the inertia wheel for the propulsion thereof, and means under the control of the operator of the tricycle for causing the separation or approach of the driving wheels in a direction lateral of the direction of travel of the tricycle at the ground engaging portions of said driving wheels.

In testimony, that I claim the foregoing as my own, I have hereto affixed my signature in the presence of two witnesses.

JOHN AUGUST MYERS.

Witnesses:
ELMER F. MYERS,
CLAUS VALENTINE CARLSON.

Copies of this patent may be obtained for five cents each, by addressing the "Commissioner of Patents, Washington, D. C."